(12) United States Patent
Wilhelmsson

(10) Patent No.: US 9,740,716 B2
(45) Date of Patent: Aug. 22, 2017

(54) SYSTEM AND METHOD FOR DYNAMICALLY SELECTING A GARBAGE COLLECTION ALGORITHM BASED ON THE CONTENTS OF HEAP REGIONS

(71) Applicant: Oracle International Corporation, Redwood Shores, CA (US)

(72) Inventor: Jesper Wilhelmsson, Uppsala (SE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/972,719

(22) Filed: Aug. 21, 2013

(65) Prior Publication Data
US 2015/0058381 A1    Feb. 26, 2015

(51) Int. Cl.
G06F 17/30    (2006.01)
G06F 9/455    (2006.01)
G06F 12/02    (2006.01)
G06F 9/44     (2006.01)
G06F 9/50     (2006.01)

(52) U.S. Cl.
CPC .... *G06F 17/30306* (2013.01); *G06F 9/45533* (2013.01); *G06F 12/0253* (2013.01); *G06F 9/4435* (2013.01); *G06F 9/5016* (2013.01)

(58) Field of Classification Search
CPC .......................... G06F 12/0253; G06F 12/0276
USPC ............................. 707/813, 999.202, 999.206
See application file for complete search history.

(56) References Cited

U.S. PATENT DOCUMENTS 5,960,087 A *  9/1999  Tribble ............... G06F 12/0261
                                                  380/30
6,065,020 A    5/2000  Dussud
6,199,075 B1 * 3/2001  Ungar ................. G06F 12/0276
(Continued)

FOREIGN PATENT DOCUMENTS

WO         02091175        11/2002

OTHER PUBLICATIONS

Jones, Richard; Lins, Raphaels, "Garbage Collection, Algorithms for Automatic Dynamic Memory Management" John Wiley & Sons, 1996.*

(Continued)

*Primary Examiner* — Sheree Brown
(74) *Attorney, Agent, or Firm* — Tucker Ellis LLP

(57) ABSTRACT

A system and method for dynamically selecting a garbage collection algorithm based on the contents of heap regions. In accordance with an embodiment, a software application can be instrumented so that the system can place software objects allocated by the application, or by different parts of the application, into different regions of the heap. When garbage collection is invoked, the system can scan the heap, examine object statistics to determine if particular objects are, e.g., short-lived, long-lived, or some other type of object, and then use this information to determine which garbage collection algorithm to use with particular heap regions. In accordance with an embodiment, the system can identify regions as containing particular object types, for example, movable or non-movable object types, or object liveness, and use different garbage collection algorithms accordingly. Different garbage collection algorithms can be used with different regions, based on their content at a particular time.

21 Claims, 12 Drawing Sheets

(56) References Cited

U.S. PATENT DOCUMENTS

| | | | |
|---|---|---|---|
| 6,317,869 B1* | 11/2001 | Adl-Tabatabai | G06F 9/45516 707/999.202 |
| 6,449,626 B1* | 9/2002 | Garthwaite | G06F 12/0276 |
| 6,484,188 B1* | 11/2002 | Kwong | G06F 9/443 |
| 6,493,730 B1 | 12/2002 | Lewis | |
| 6,757,890 B1* | 6/2004 | Wallman | G06F 8/43 711/E12.006 |
| 6,820,101 B2* | 11/2004 | Wallman | G06F 9/4425 |
| 6,836,782 B1* | 12/2004 | Fresko et al. | |
| 6,996,829 B2* | 2/2006 | Meyer | 719/328 |
| 7,074,354 B2* | 7/2006 | Watanabe | B29C 67/0066 264/245 |
| 7,092,978 B2* | 8/2006 | Garthwaite | G06F 12/0269 |
| 7,155,467 B1* | 12/2006 | Rohrs | G06F 12/0269 |
| 7,237,085 B2* | 6/2007 | Sexton | G06F 11/3636 707/999.202 |
| 7,272,695 B1* | 9/2007 | Detlefs | G06F 12/0269 711/118 |
| 7,404,182 B1* | 7/2008 | Garthwaite | G06F 12/0269 707/999.202 |
| 7,490,330 B2* | 2/2009 | Sexton et al. | 719/312 |
| 7,506,317 B2* | 3/2009 | Liang et al. | 717/130 |
| 7,620,943 B1* | 11/2009 | Garthwaite | G06F 12/0276 707/999.202 |
| 7,676,801 B1* | 3/2010 | Garthwaite | G06F 12/0276 711/6 |
| 7,783,681 B1* | 8/2010 | Delsart | G06F 12/0269 707/813 |
| 8,327,109 B2* | 12/2012 | Caspole | 711/173 |
| 8,495,107 B2* | 7/2013 | Khanna | 707/813 |
| 8,504,878 B2* | 8/2013 | Otenko | G06F 11/366 711/170 |
| 8,555,264 B2* | 10/2013 | Ohrstrom | 717/148 |
| 8,713,546 B2* | 4/2014 | Lagergren | 717/151 |
| 8,805,896 B2* | 8/2014 | Khanna | 707/813 |
| 8,826,249 B2* | 9/2014 | Dice | G06F 8/456 717/148 |
| 8,863,079 B2* | 10/2014 | Darcy et al. | 717/108 |
| 2002/0042807 A1* | 4/2002 | Thomas | G06F 8/4442 718/1 |
| 2002/0087589 A1* | 7/2002 | Wallman | G06F 9/4425 |
| 2004/0098553 A1* | 5/2004 | Garthwaite | G06F 12/0276 711/170 |
| 2004/0167945 A1* | 8/2004 | Garthwaite | G06F 9/4435 |
| 2004/0193828 A1* | 9/2004 | Nevill | G06F 12/0253 711/170 |
| 2005/0160416 A1* | 7/2005 | Jamison | 717/154 |
| 2005/0198088 A1* | 9/2005 | Subramoney | G06F 17/30348 |
| 2007/0022149 A1* | 1/2007 | Bacon | G06F 12/0269 |
| 2007/0174370 A1* | 7/2007 | Detlefs | G06F 12/0276 |
| 2008/0140737 A1* | 6/2008 | Garst | G06F 12/0269 |
| 2009/0013017 A1* | 1/2009 | Branda et al. | 707/206 |
| 2011/0276833 A1* | 11/2011 | Otenko | G06F 11/366 714/38.1 |
| 2012/0151458 A1* | 6/2012 | Ohrstrom | 717/148 |
| 2014/0096116 A1* | 4/2014 | Ohrstrom | 717/148 |
| 2014/0137087 A1* | 5/2014 | Cimadamore et al. | 717/140 |
| 2014/0201742 A1* | 7/2014 | Lagergren | 718/1 |
| 2014/0280364 A1* | 9/2014 | Reynolds et al. | 707/803 |
| 2015/0006843 A1* | 1/2015 | Moser | 711/170 |

OTHER PUBLICATIONS

Henry Baker; "List Processing in Real Time on a Serial COmputer", Comm. ACM 21, 4 (Apr. 1978), 280-293.*

International Searching Authority At the European Patent Office, International Search Report and Written Opinion for PCT International Patent Application No. PCT/US2014/051925, Nov. 13, 2014, 10 pages.

Sun Microsystems, Memory Management in the JAVA HotSpot Virtual Machine, Apr. 2006, 21 pages.

International Preliminary Report on Patentability mailed Mar. 2, 2016 for international patent application No. PCT/US2014/051925 (7 pages).

* cited by examiner

SYSTEM AND METHOD FOR DYNAMICALLY SELECTING A GARBAGE COLLECTION ALGORITHM BASED ON THE CONTENTS OF HEAP REGIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to garbage-collected software languages, such as Java, and is particularly related to a system and method for dynamically selecting a garbage collection algorithm based on the contents of heap regions.

BACKGROUND

In a computer system, the software objects for a running software application are stored in an area of system memory where they can be readily accessed. Although some software languages support manual memory allocation, such that the memory occupied by software objects can be manually allocated and deallocated; other software languages, such as Java, utilize dynamic memory allocation, together with a garbage collector that periodically reclaims memory occupied by software objects that are no longer in use by running software applications.

The area of memory that stores software objects is generally referred to as the heap. A virtual machine maintains the heap for use by software applications, including determining the garbage collector or garbage collection algorithm to use. Examples of different garbage collection algorithms include copying, mark-sweep, reference counting, and variations thereof, such as mark-copy and mark-split. Each of the different garbage collection algorithms provides advantages and disadvantages, depending on the particular computing environment in which they are used.

SUMMARY

Described herein is a system and method for dynamically selecting a garbage collection algorithm based on the contents of heap regions. In accordance with an embodiment, a software application can be instrumented so that the system can place software objects allocated by the application, or by different parts of the application, into different regions of the heap. When garbage collection is invoked, the system can scan the heap, examine object statistics to determine if particular objects are, for example, short-lived, long-lived, or some other type of object, and then use this information to determine which garbage collection algorithm to use with particular heap regions. In accordance with an embodiment, the system can identify regions as containing particular object types, for example, movable or non-movable object types, or object liveness, and use different garbage collection algorithms accordingly. Different garbage collection algorithms can be used with different regions, based on their content at a particular time.

DETAILED DESCRIPTION

As described above, in a computer system which utilizes garbage collection, the system maintains a heap for use by software applications and their software objects, including determining the garbage collector or garbage collection algorithm to use. Examples of different garbage collection algorithms include copying, mark-sweep, reference counting, and variations thereof, such as mark-copy and mark-split; each of which provides advantages and disadvantages depending on the particular computing environment in which they are used.

In accordance with an embodiment, described herein is a system and method for dynamically selecting a garbage collection algorithm based on the contents of heap regions.

In accordance with an embodiment, a software application can be instrumented so that the system can place software objects allocated by the application, or by different parts of the application, into different regions of the heap.

For example, in accordance with an embodiment, a transaction processing code within the software application can be instrumented such that its allocated objects are put into a region of the heap intended for short-lived transaction objects; while an in-memory database code within the software application can be instrumented such that its allocated objects are put into a region intended for long-lived database objects.

In accordance with an embodiment, when garbage collection is invoked, the system can scan the heap, examine object statistics to determine if particular objects are, for example, short-lived, long-lived, or some other type of object, and then use this information to select or determine which garbage collection algorithm to use with particular heap regions. For example, if I/O buffers are being allocated to a particular region of the heap, the system may, during a first garbage collection, determine to use a non-moving garbage collection algorithm with that region; but, during a subsequent garbage collection (since I/O buffers are generally short-lived and the region's contents may have changed) determine to use a different, e.g., copying, garbage collection algorithm with that region.

In accordance with an embodiment, the system can identify regions as containing particular object types, for example, movable or non-movable object types, or object liveness, and use different garbage collection algorithms accordingly. Different garbage collection algorithms can be used with different regions, based on their content at a particular time, including different algorithms operating at the same time within different regions of the heap. This provides a fine-grained approach to the choice of which garbage collection algorithm is used.

Introduction

Figure 1:
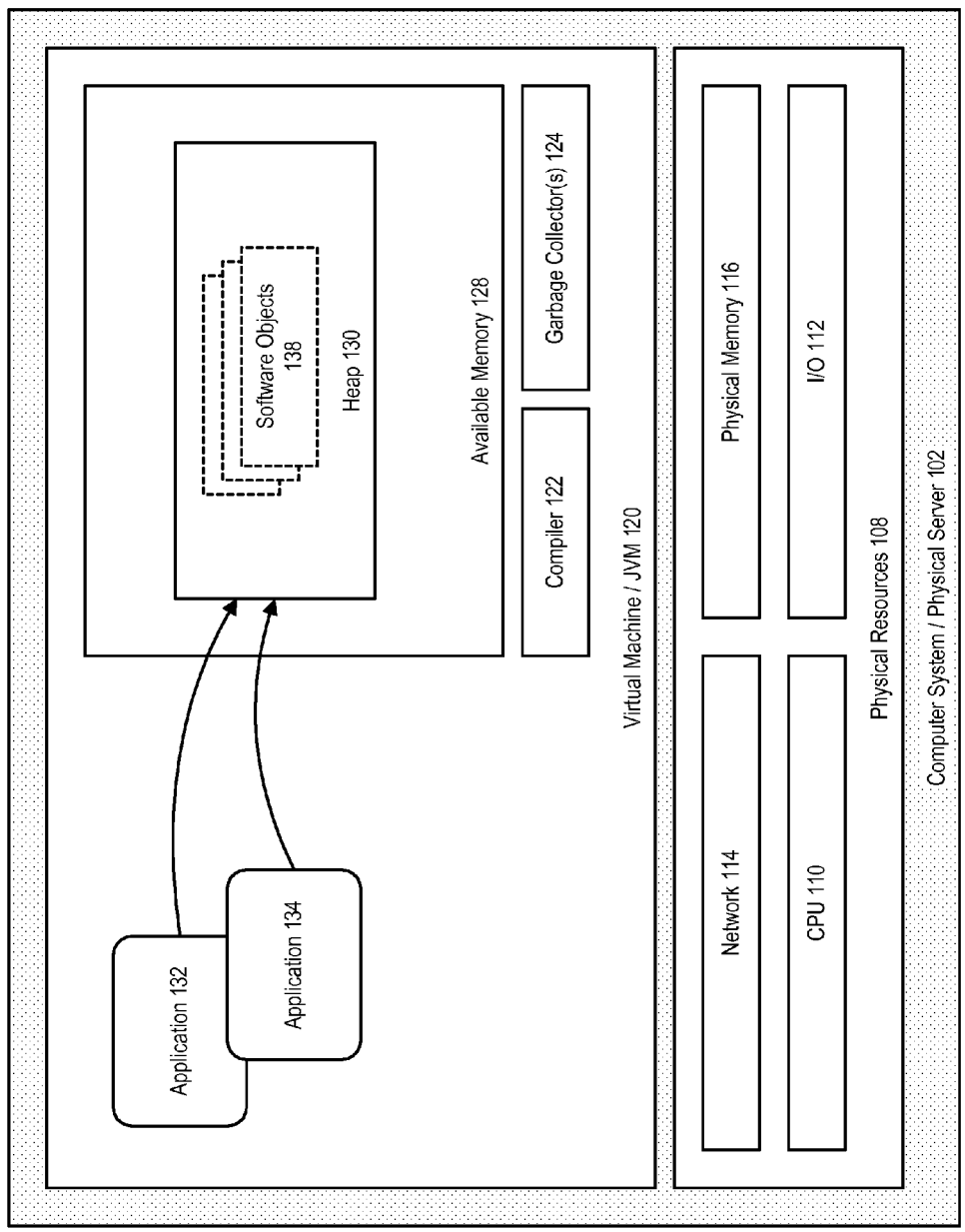
FIG. 1 illustrates a system which enables dynamically selecting a garbage collection algorithm based on the contents of heap regions, in accordance with an embodiment.

FIG. 1 illustrates a system which enables dynamically selecting a garbage collection algorithm based on the contents of heap regions, in accordance with an embodiment.

As shown in FIG. 1, in accordance with an embodiment, the system can comprise one or more physical computers, servers, or computing devices 102. Each computer or computing device can include physical computing resources 108, such as one or more processors (CPU) 110, input/output (I/O) components 112, networking resources 114, and physical memory storage 116. A virtual machine 120 enables compiled software applications to be run thereon, independently of the hardware or operating system used underneath. In accordance with an embodiment, the virtual machine can be a Java virtual machine (JVM, for example, an Oracle HotSpot, JRockit, or other type of JVM which executes Java software applications). Each virtual machine also includes a software compiler 122, and one or more garbage collector(s) 124. As described herein, a garbage collector performs or otherwise implements a garbage collection algorithm. In accordance with an embodiment, a garbage collector can perform or implement several different garbage collector garbage collection algorithms. Alternatively, in accordance with an embodiment, the virtual machine can include several different garbage collectors, each of which can perform or implement a different garbage collector garbage collection algorithm.

In accordance with an embodiment, an available memory 128 comprises a heap 130, for storage of compiled bytecode by one or more software applications 132, 134. In some embodiments, the software applications can run within an application server (for example, a WebLogic instance, or another type of application server instance), outside of the virtual machine itself. The virtual machine maintains the heap for use by the software applications, including determining which garbage collection algorithm to use. The garbage collector(s) perform according to their garbage collector garbage collection algorithms, to periodically reclaim memory occupied by software objects 138 that are no longer in use by running software applications.

As described in further detail below, examples of different garbage collectors, or garbage collection algorithms include copying, mark-sweep, reference counting, and variations thereof, such as mark-copy and mark-split. Each of the different garbage collection algorithms provides advantages and disadvantages, depending on the particular computing environment in which they are used.

Garbage Collection (GC) Algorithms

As described above, a garbage collector periodically reclaims memory occupied by software objects that are no longer in use by running software applications.

Generally, objects that are currently referenced are considered live; while objects that are no longer referenced are considered dead or garbage. The timing as to when to perform garbage collection is generally determined by the garbage collector itself. Typically the heap is garbage-collected when it is full, or when it reaches a particular level of occupancy.

Desirable characteristics of a garbage collector generally include that it be safe such that live objects are not erroneously garbage-collected; that it operate efficiently without introducing long pauses during which the application is not running; and that it avoid heap fragmentation. Some of the design choices that are typically made when selecting a particular garbage collection algorithm include the decisions to use serial versus parallel; concurrent versus stop-the-world; and compacting versus non-compacting garbage collection.

A typical Java virtual machine supports the use of different garbage collectors or garbage collection algorithms, such as a serial collector, parallel collector, parallel compacting collector, or concurrent mark-sweep collector, examples of which are described below by way of illustration.

With a serial collector, memory is divided into generations holding objects of different ages, for example, young objects and old objects. Both the young and old collections are performed serially, in a stop-the world fashion. Software application execution is halted while garbage collection is taking place. Live objects in an Eden space are copied to an initially empty survivor space. The live objects in the occupied survivor space that are still relatively young are copied to another survivor space, while objects that are relatively old are copied to the old generation. After a young generation collection is complete, both the Eden space and formerly occupied survivor spaces are empty, and only the formerly empty survivor space contains live objects. At this point, the survivor spaces swap roles. The old and permanent generations are then collected using a mark-sweep-compact garbage collection algorithm.

With a parallel collector, the garbage collector uses a parallel version of the young generation garbage collection algorithm utilized by the serial collector, and is also a stop-the-world copying collector, but performs its young generation collection in parallel, which decreases garbage collection overhead and hence increases application throughput. The old generation collection is performed using the same serial mark-sweep compact garbage collection algorithm as the serial collector.

With a parallel compacting collector, the young generation collection is performed using the same garbage collection algorithm as that for young generation collection using the parallel collector; but the old and permanent generations are collected in a stop-the world, mostly parallel fashion with sliding compaction.

With a concurrent mark-sweep collector, the young generation is collected in the same manner as the parallel collector, and most of the collection of the old generation is performed concurrently with the execution of the application. Because the software application is running and updating reference fields while the marking phase is taking place, not all live objects are guaranteed to be marked at the end of the concurrent marking phase. To handle this, the application stops for a second pause, referred to as remarking, which finalizes marking by revisiting any objects that were modified during the concurrent marking phase.

The above examples are provided to illustrate different types of garbage collector and garbage collection algorithms that can be used, and are not intended to be an exhaustive list, or to reflect a particular virtual machine environment. In accordance with various embodiments, the garbage collection algorithms supported by a particular system can include variations of the above, and/or additional or different types of garbage collection algorithms.

Some virtual machine products provide a measure of control over the type of garbage collection algorithm used for different parts of memory. For example, the Erlang runtime system Open Telecom Platform (OTP) uses a copying garbage collection algorithm for the process heaps, and a reference counting garbage collection algorithm for the off-heap area. The HotSpot JVM can be configured to use a copying garbage collection algorithm for the young generation, and a mark-sweep garbage collection algorithm for the old generation. The JRockit JVM enables properties of the garbage collection algorithm to be changed, although the core garbage collection algorithm remains a mark-sweep collector, whether it is run in a stop-the-world or a concurrent fashion. The G1 garbage collector divides its heap into several regions, and each region can be used for the young or the old generation, although a copying garbage collection algorithm is used to perform garbage collection in all regions. However, each of the above approaches are generally static, and do not change at runtime the garbage collection algorithm they will use.

Dynamic GC Algorithm Selection

Described herein is a system and method for dynamically selecting a garbage collection algorithm based on the contents of heap regions.

In accordance with an embodiment, a software application can be instrumented so that the system can place software objects allocated by the application, or by different parts of the application, into different regions of the heap. When garbage collection is invoked, the system can scan the heap, examine object statistics to determine if particular objects are, for example, short-lived, long-lived, or some other type of object, and then use this information to determine which garbage collection algorithm to use with particular heap regions.

In accordance with an embodiment, the system can identify regions as containing particular object types, for example, movable or non-movable object types, or object liveness, and use different garbage collection algorithms accordingly. For example, a region with just a few live objects may be preferably collected using a copying collector, while a region with say 60-70% live data may be better collected using a non-moving collector. This provides a fine-grained approach to the choice of which garbage collection algorithm is used.

In accordance with an embodiment, the regions are not necessarily related to, for example, the young and old generation regions, but instead can be dynamically laid out depending on the contents of the heap.

Figure 2:
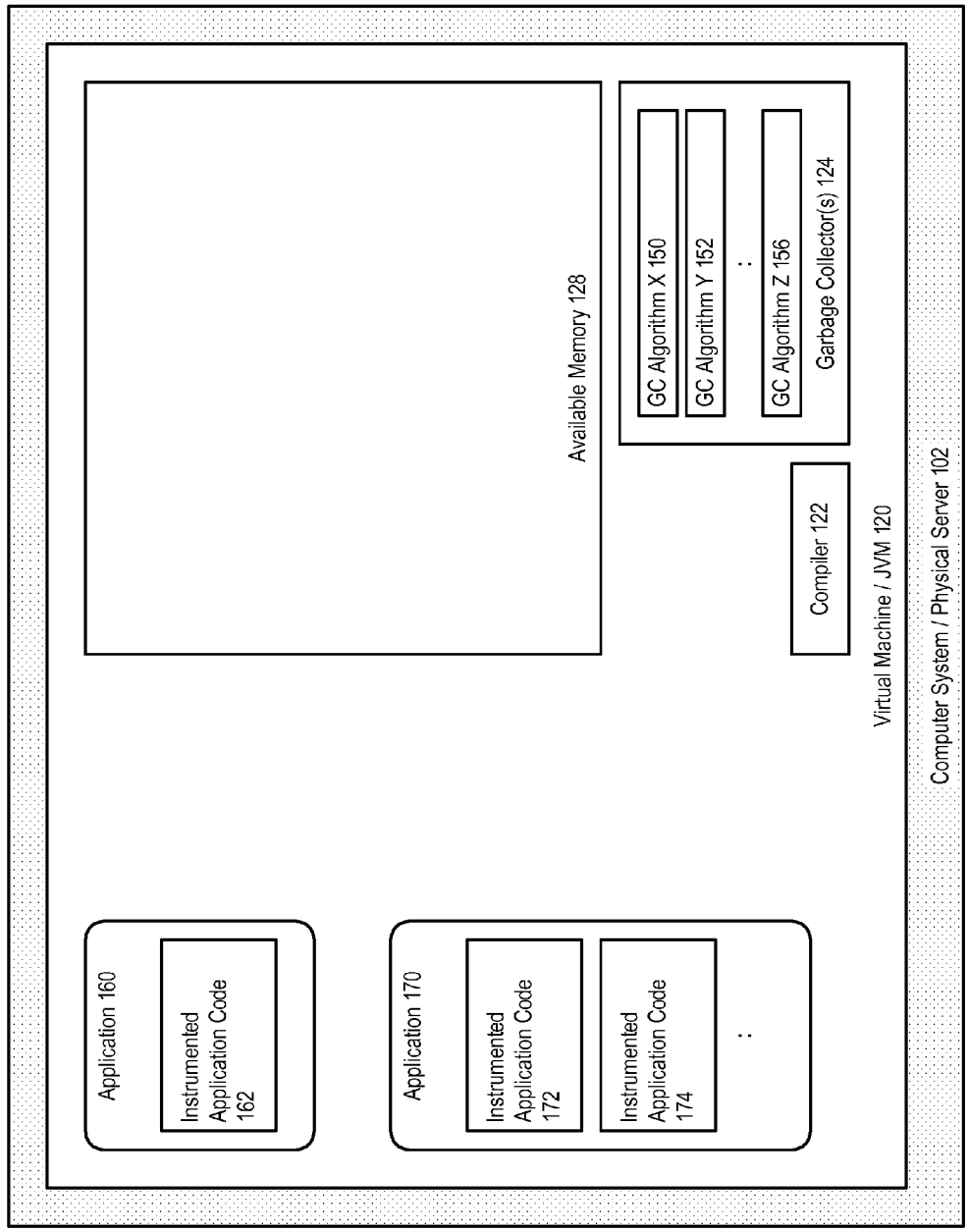
FIG. 2 illustrates the use of a system for dynamically selecting a garbage collection algorithm based on the contents of heap regions, in accordance with an embodiment.

FIG. 2 illustrates the use of a system for dynamically selecting a garbage collection algorithm based on the contents of heap regions, in accordance with an embodiment. As shown in FIG. 2, in accordance with an embodiment, the system can include one or more garbage collector(s) that can perform a plurality of garbage collection algorithms, here illustrated as GC Garbage collection algorithm X 150, GC Garbage collection algorithm Y 152, and GC garbage collection algorithm Z 156. As described above, examples of different garbage collection algorithms include copying, mark-sweep, reference counting, and variations thereof, such as mark-copy and mark-split.

In accordance with an embodiment, to determine regions within the heap, the applications can be instrumented, so that objects allocated by the application, or by different parts of the application, can be placed into different regions of the heap. For example, as illustrated in FIG. 2, an application 160 can have a portion of its application code instrumented 162, such that software objects allocated by or associated with that portion of the application code are placed into a particular region of the heap. As further illustrated in FIG. 2, an application 170 can have a plurality of application codes instrumented 172, 174, such that software objects allocated by or associated with those different portions of code are placed into different regions of the heap.

For example, in accordance with an embodiment, a transaction processing code within an application might put all allocated objects in a region for short-lived transaction objects; whereas an in-memory database code within the application might put allocated objects in a region for long-lived database objects.

Figure 3:
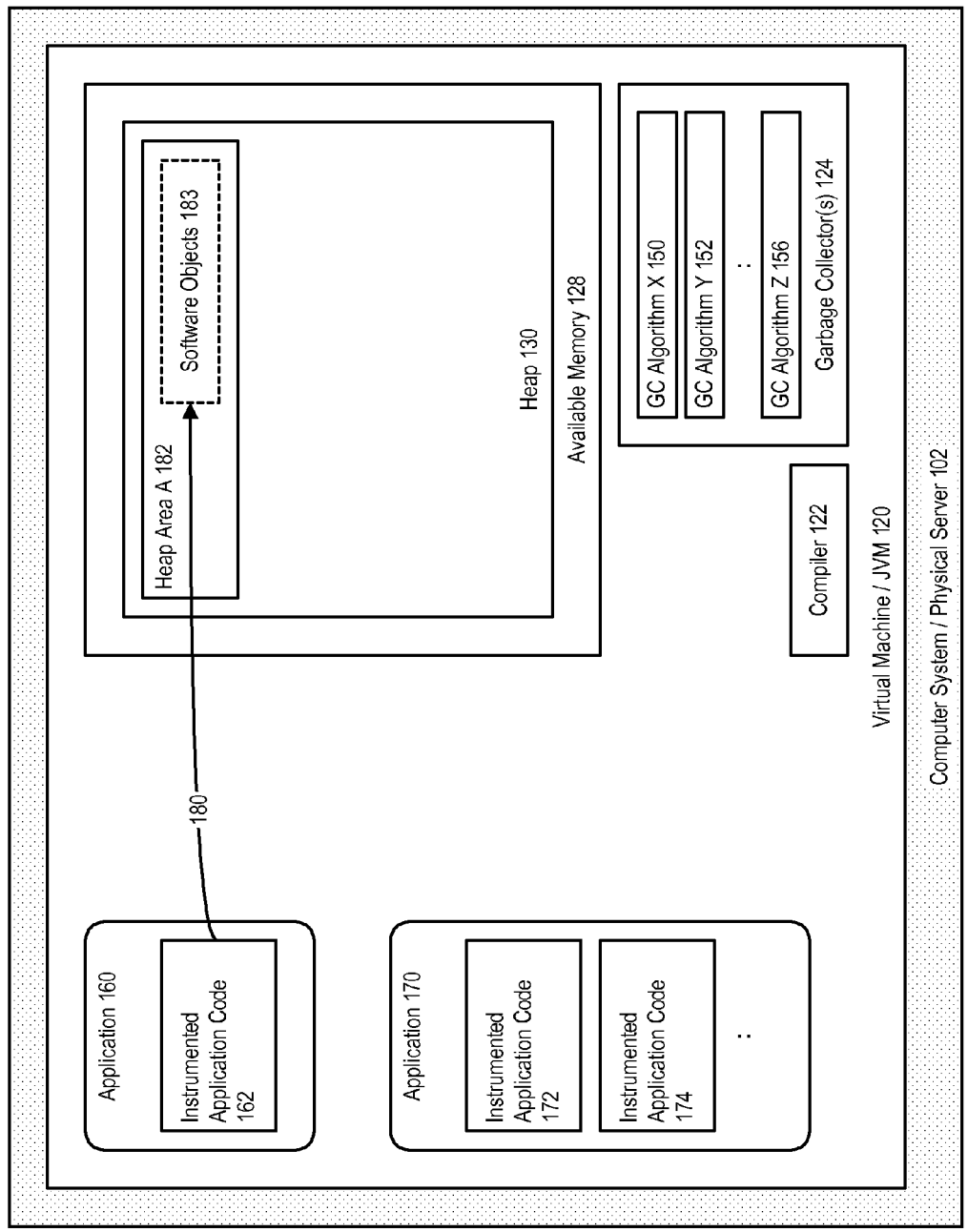
FIG. 3 further illustrates dynamic selection of a garbage collection algorithm based on the contents of heap regions, in accordance with an embodiment.

FIG. 3 further illustrates dynamic selection of a garbage collection algorithm based on the contents of heap regions, in accordance with an embodiment. As shown in FIG. 3, in accordance with an embodiment, based on the instrumentation within the code, the virtual machine can allocate 180 software objects 183 so that they are placed into a particular region of the heap, here indicated as heap area A 182.

Figure 4:
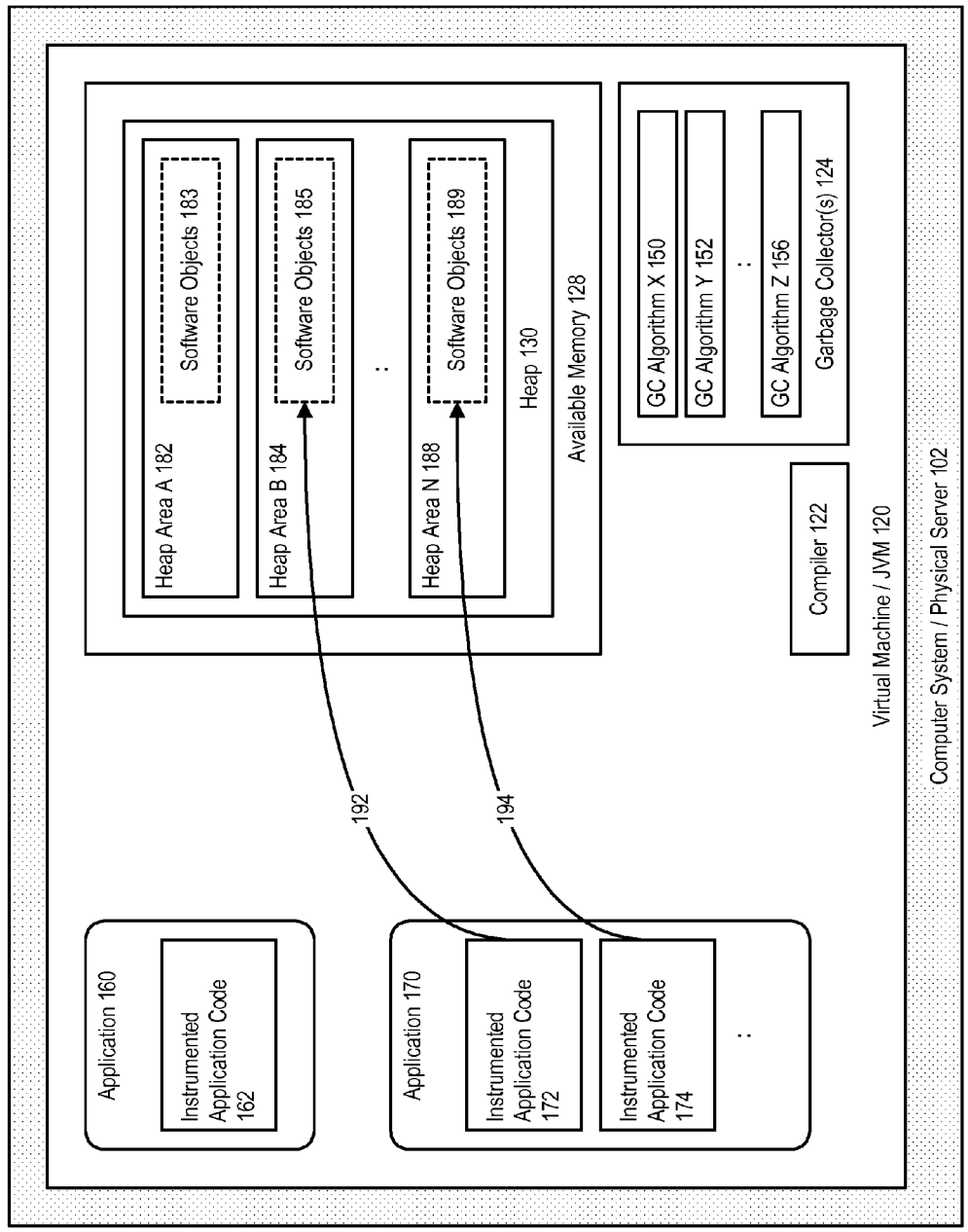
FIG. 4 further illustrates dynamic selection of a garbage collection algorithm based on the contents of heap regions, in accordance with an embodiment.

FIG. 4 further illustrates dynamic selection of a garbage collection algorithm based on the contents of heap regions, in accordance with an embodiment. As shown in FIG. 4, in accordance with an embodiment, based on the instrumentation within different application codes, the virtual machine can allocate 192, 194 software objects 185, 189 into different regions of the heap, here indicated as heap area B 184, and heap area N 188, respectively.

Figure 5:
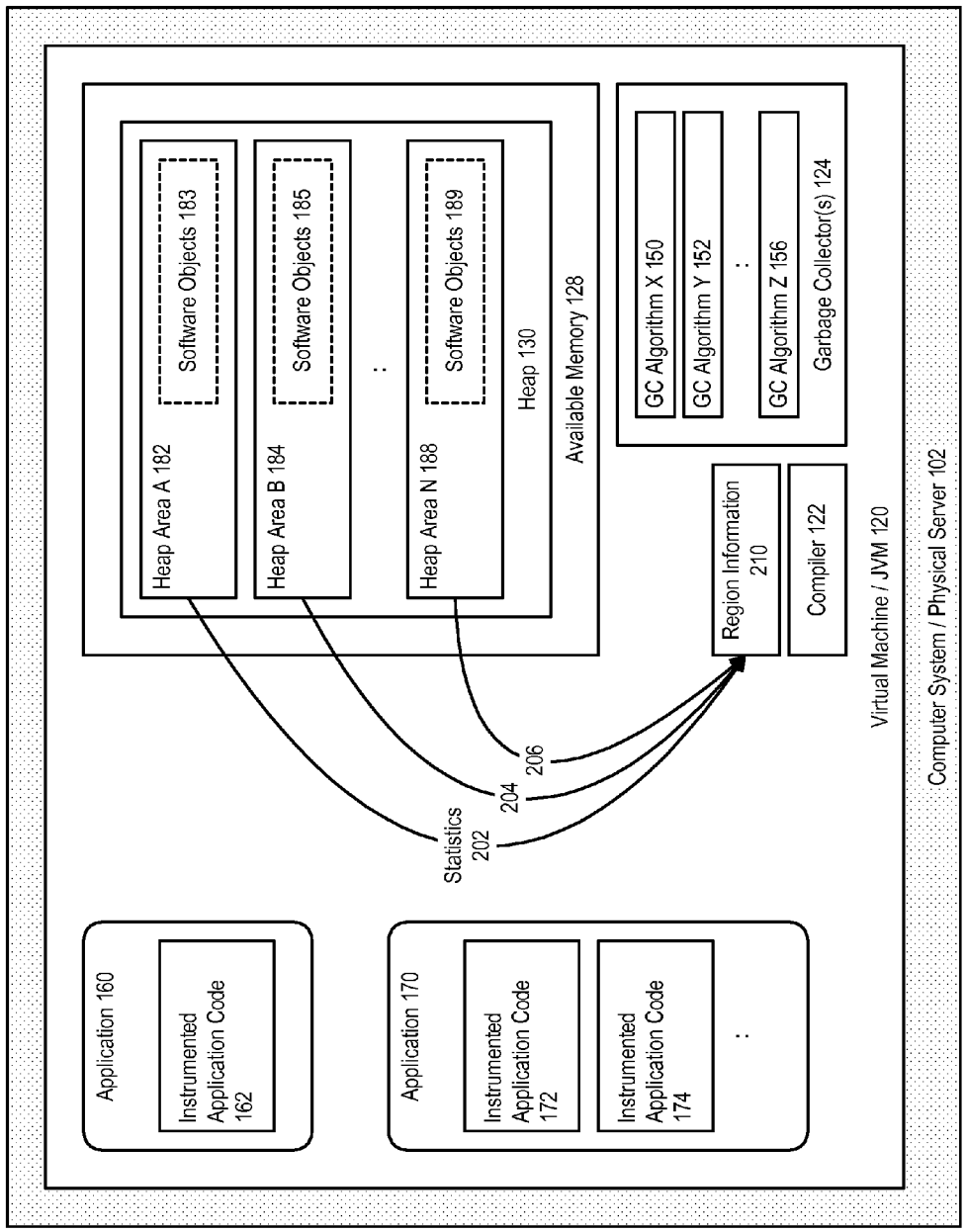
FIG. 5 further illustrates dynamic selection of a garbage collection algorithm based on the contents of heap regions, in accordance with an embodiment.

FIG. 5 further illustrates dynamic selection of a garbage collection algorithm based on the contents of heap regions, in accordance with an embodiment. As shown in FIG. 5, in accordance with an embodiment, the virtual machine can determine statistics 202, 204, 206 describing the object types stored in the various regions of the heap, and collect that statistical information 210, for subsequent use during garbage collection.

For example, in accordance with an embodiment, the virtual machine can scan the various regions of the heap, and examine object statistics to determine if the data in a particular region of the heap can be generally considered, for example, short-lived, long-lived, thread local, fragmented, large objects, or small objects.

Figure 6:
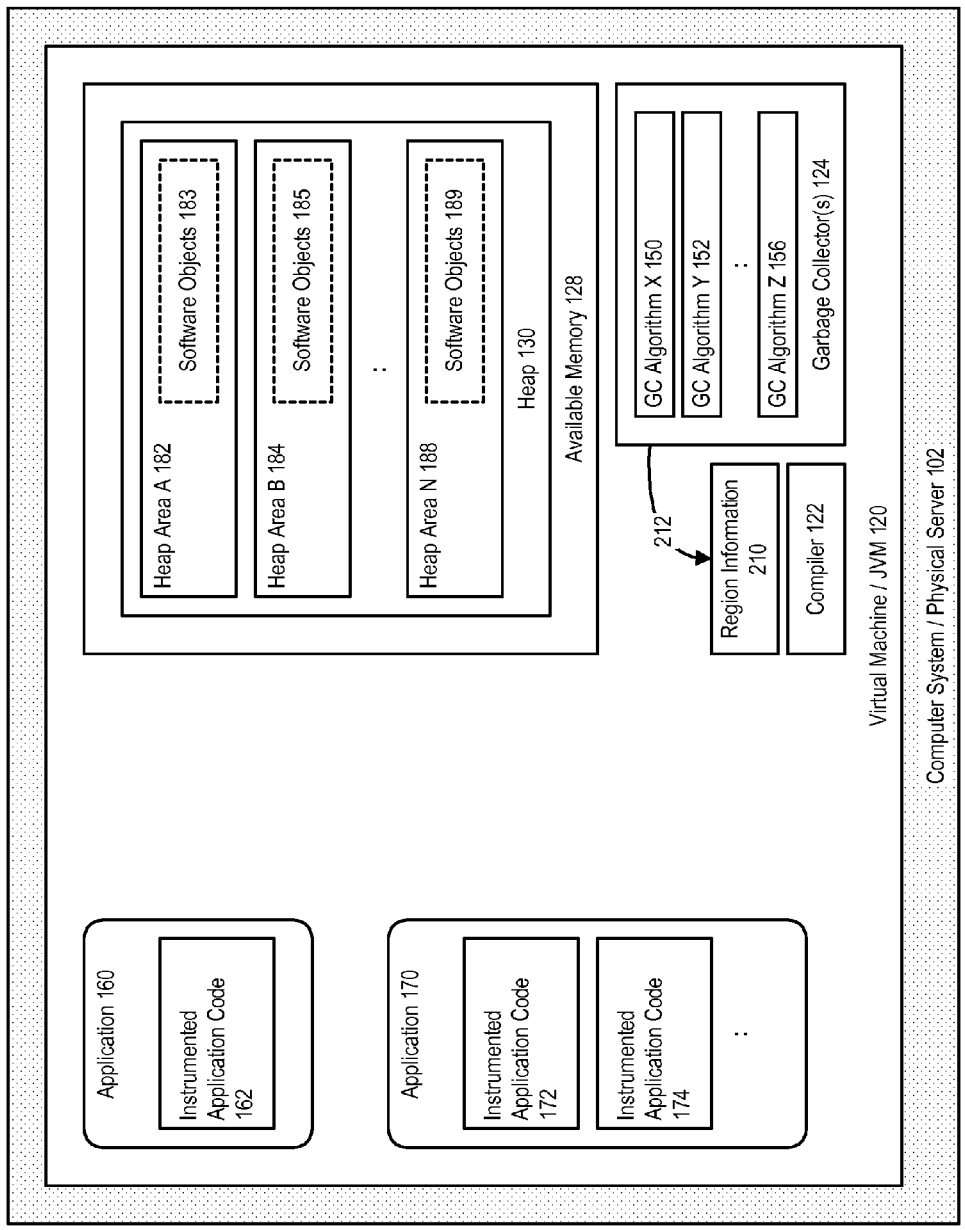
FIG. 6 further illustrates dynamic selection of a garbage collection algorithm based on the contents of heap regions, in accordance with an embodiment.

FIG. 6 further illustrates dynamic selection of a garbage collection algorithm based on the contents of heap regions, in accordance with an embodiment. As shown in FIG. 6, in accordance with an embodiment, the system including the virtual machine and/or the garbage collectors can then use 212 the statistical information regarding the various regions of the heap, to determine an appropriate garbage collection algorithm to be used with a particular region.

Figure 7:
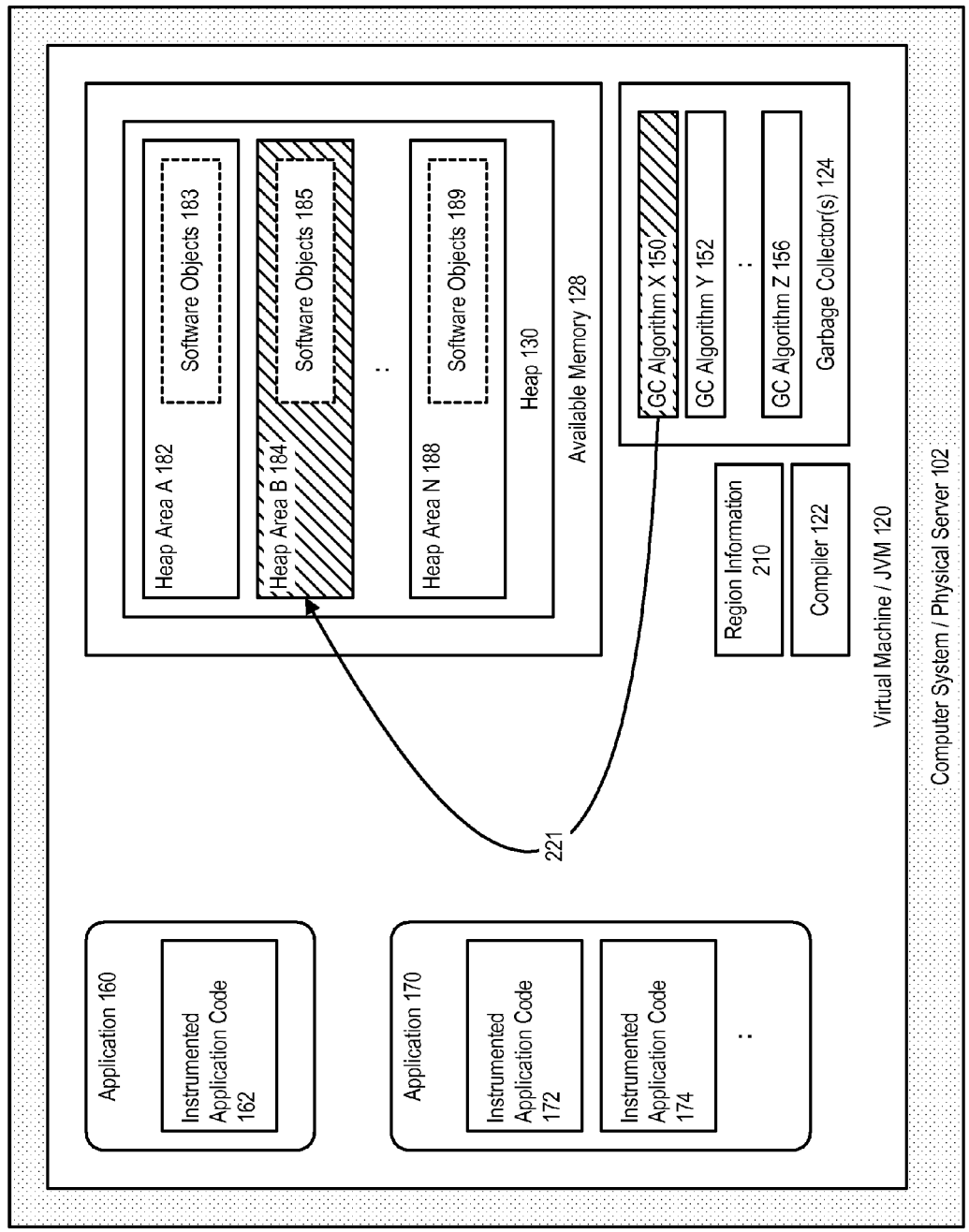
FIG. 7 further illustrates dynamic selection of a garbage collection algorithm based on the contents of heap regions, in accordance with an embodiment.

FIG. 7 further illustrates dynamic selection of a garbage collection algorithm based on the contents of heap regions, in accordance with an embodiment. As shown in FIG. 7, by way of example, the system may determine that the most appropriate garbage collection algorithm to use with the objects in its heap area B is garbage collection algorithm X, and will use that garbage collection algorithm to garbage collect 221 that region accordingly.

For example, in accordance with an embodiment, when garbage collection is invoked at a particular time, to determine which garbage collection algorithm to select and use, the system might determine that, if a particular region generally contains short lived data generated during transaction processing, then it should use a parallel garbage collector/garbage collection algorithm; whereas if the region generally contains static data structures that rarely change, then it should use a concurrent garbage collector/garbage collection algorithm. When garbage collection is invoked at a subsequent time, the system might determine that the region's contents have changed, and elect to use a different garbage collector/garbage collection algorithm for that region. For example, in accordance with an embodiment that use a G1 garbage collector, a determination can be made during the concurrent mark phase of the garbage collection as to which garbage collection algorithm should be used with each region.

Figure 8:
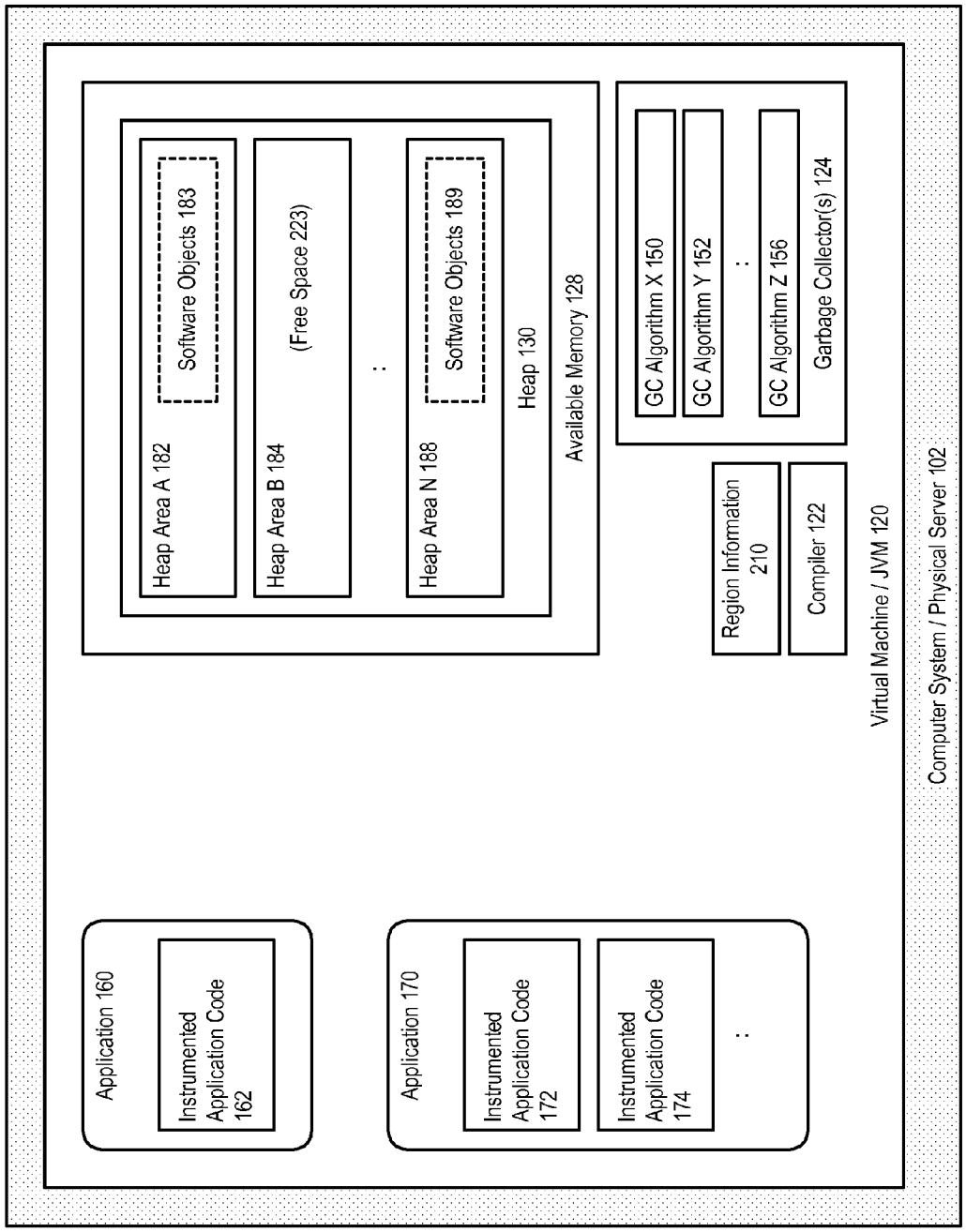
FIG. 8 further illustrates dynamic selection of a garbage collection algorithm based on the contents of heap regions, in accordance with an embodiment.

FIG. 8 further illustrates dynamic selection of a garbage collection algorithm based on the contents of heap regions, in accordance with an embodiment. As shown in FIG. 8, in accordance with an embodiment, once the area has been garbage-collected the region becomes free space 223, for use by newly allocated software objects.

Figure 9:
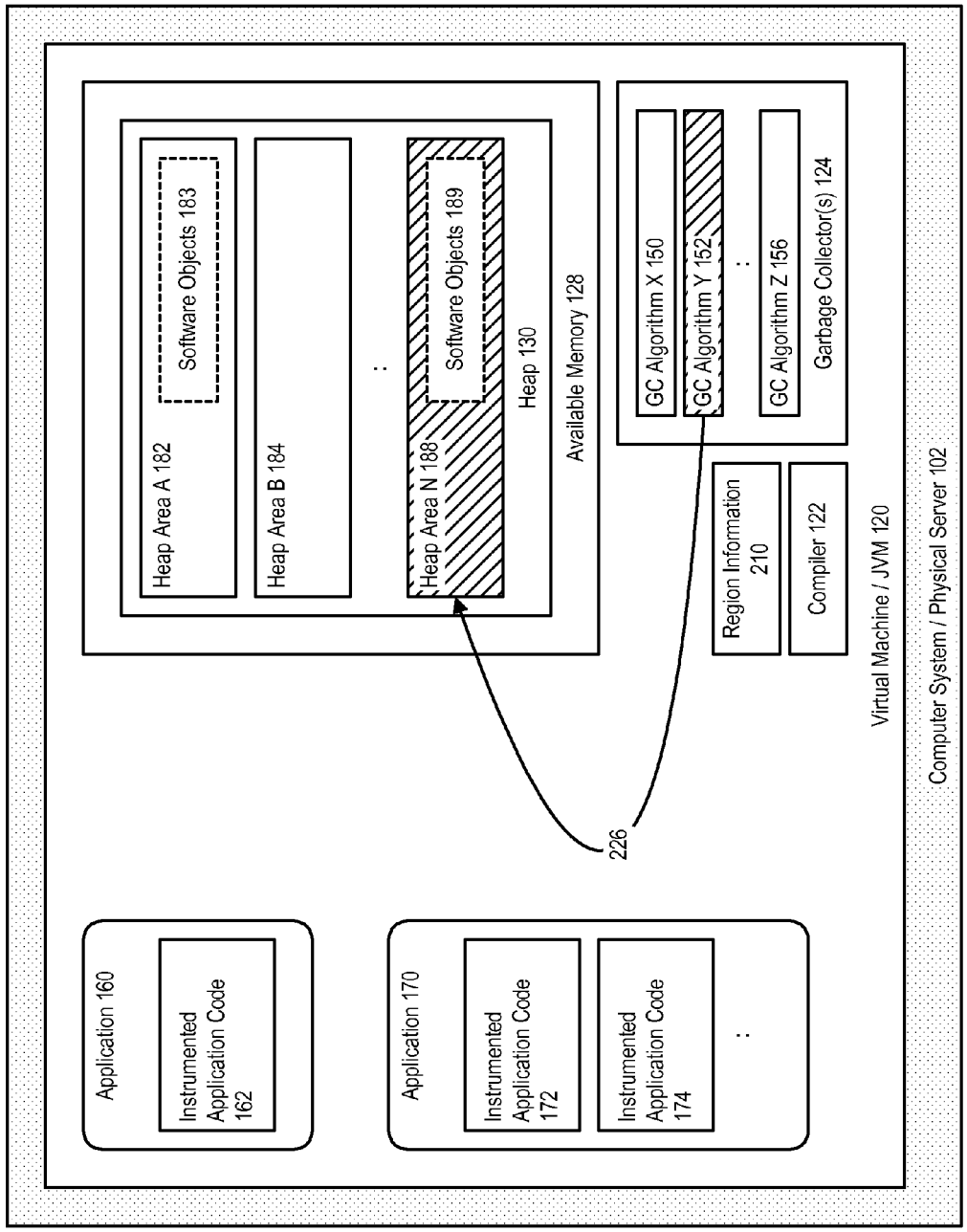
FIG. 9 further illustrates dynamic selection of a garbage collection algorithm based on the contents of heap regions, in accordance with an embodiment.

FIG. 9 further illustrates dynamic selection of a garbage collection algorithm based on the contents of heap regions, in accordance with an embodiment. As shown in FIG. 9, the system may, for example determine that the most appropriate garbage collection algorithm to use with the objects in heap area N is garbage collection algorithm Y, and will garbage collect 226 that region accordingly.

For example, in accordance with an embodiment, to determine which garbage collection algorithm to select and use the system might determine that, if the region generally contains large objects, or the region is generally well compacted, then it should use a mark and sweep garbage collector/garbage collection algorithm; whereas if the region is very fragmented, then it should use a copying garbage collector/garbage collection algorithm. This means that, in accordance with an embodiment, during a particular garbage collection, the system can determine to use a first garbage collection algorithm with a first region of the heap (say, heap area B), and a second garbage collection algorithm with a second region of the heap (say, heap area N), based on their content; and, during a subsequent garbage collection, determine to use different garbage collection algorithms for these different regions, based on their content at that time.

In accordance with other embodiments and implementations, the virtual machine, garbage collector(s) and memory/heap space can be configured differently from the one illustrated, and employ different means of examining regions, and evaluating which garbage collection algorithm to select and use with any particular region.

Figure 10:
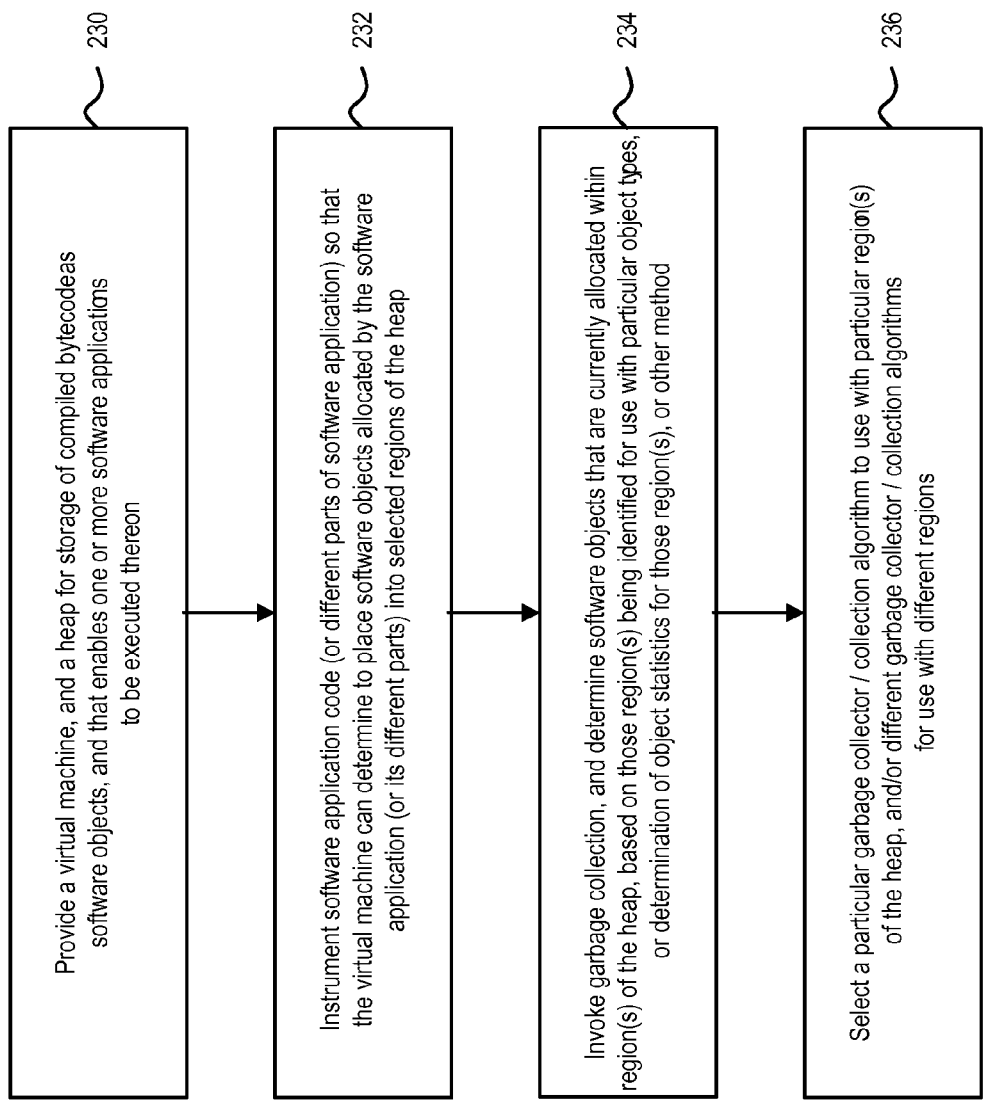
FIG. 10 shows a flowchart of a method for dynamically selecting a garbage collection algorithm based on the contents of heap regions, in accordance with an embodiment.

FIG. 10 shows a flowchart of a method for dynamically selecting a garbage collection algorithm based on the contents of heap regions, in accordance with an embodiment. As shown in FIG. 10, at step 230, a virtual machine is provided, together with a heap for storage of compiled bytecode as software objects, and that enables one or more software applications to be executed thereon.

At step 232, a software application code is instrumented (or different parts of the software application are instrumented differently) so that the virtual machine can determine to place software objects allocated by the software application (or its different parts) into selected regions of the heap. For example, in accordance with an embodiment, a transaction processing code within an application might put all allocated objects in a region for short-lived transaction objects; whereas an in-memory database code within the application might put allocated objects in a region for long-lived database objects.

At step 234, the virtual machine determines software objects that are currently allocated within region(s) of the heap, based on those region(s) being identified for use with particular object types, or a determination of object statistics for those region(s).

At step 236, the virtual machine can then select a particular garbage collector/garbage collection algorithm to use with a particular region of the heap, and/or different garbage collector/garbage collection algorithms for use with different regions.

The above flowchart is provided for purposes of illustrating a particular embodiment. In accordance with other embodiments, other methods and steps can be used to dynamically select a garbage collection algorithm based on the contents of heap regions.

Additional Use Cases

In accordance with an embodiment, the system can identify regions as containing particular object types, for example, movable or non-movable object types, or object liveness, and use different garbage collection algorithms accordingly.

For example, in some Java environments, the system makes use of I/O buffer data objects, which are areas of memory used for communication with other software applications that are outside of the virtual machine. In practice, this means that a different software application will be given a memory address where it is told to read or write data. Since that software application knows nothing about the Java garbage collection, but is holding on to a reference to the I/O buffer, the corresponding data objects cannot be moved to a different memory address during garbage collection.

Common garbage collection algorithms, such as copying garbage collection algorithms, can be considered moving garbage collection algorithms inasmuch that the objects handled by the garbage collector are moved from one area of memory to another, which prevents the virtual machine from performing garbage collection while I/O buffers exist in the virtual machine.

In accordance with an embodiment, if the system detects that I/O buffers are being allocated to the heap, the corresponding data objects can be allocated in a separate region, and the garbage collectors can subsequently use a non-moving garbage collection algorithm in that region. Alternatively, if the system does not explicitly allocate the buffers within their own region, then subsequently the object types in that region can be examined, using the technique described above, and a non-moving garbage collection algorithm selected for that region.

In accordance with an embodiment, since I/O buffers are generally short-lived, it is likely that in the next GC, that particular buffer will be garbage, and the region can be collected with a copying collector again.

The above example using I/O buffers is provided for purposes of illustrating a particular embodiment. In accordance with other embodiments, a similar approach can be used, for example, with other types of data objects that cannot be moved, or that impose other restrictions with regard to their garbage collection.

Figure 11:
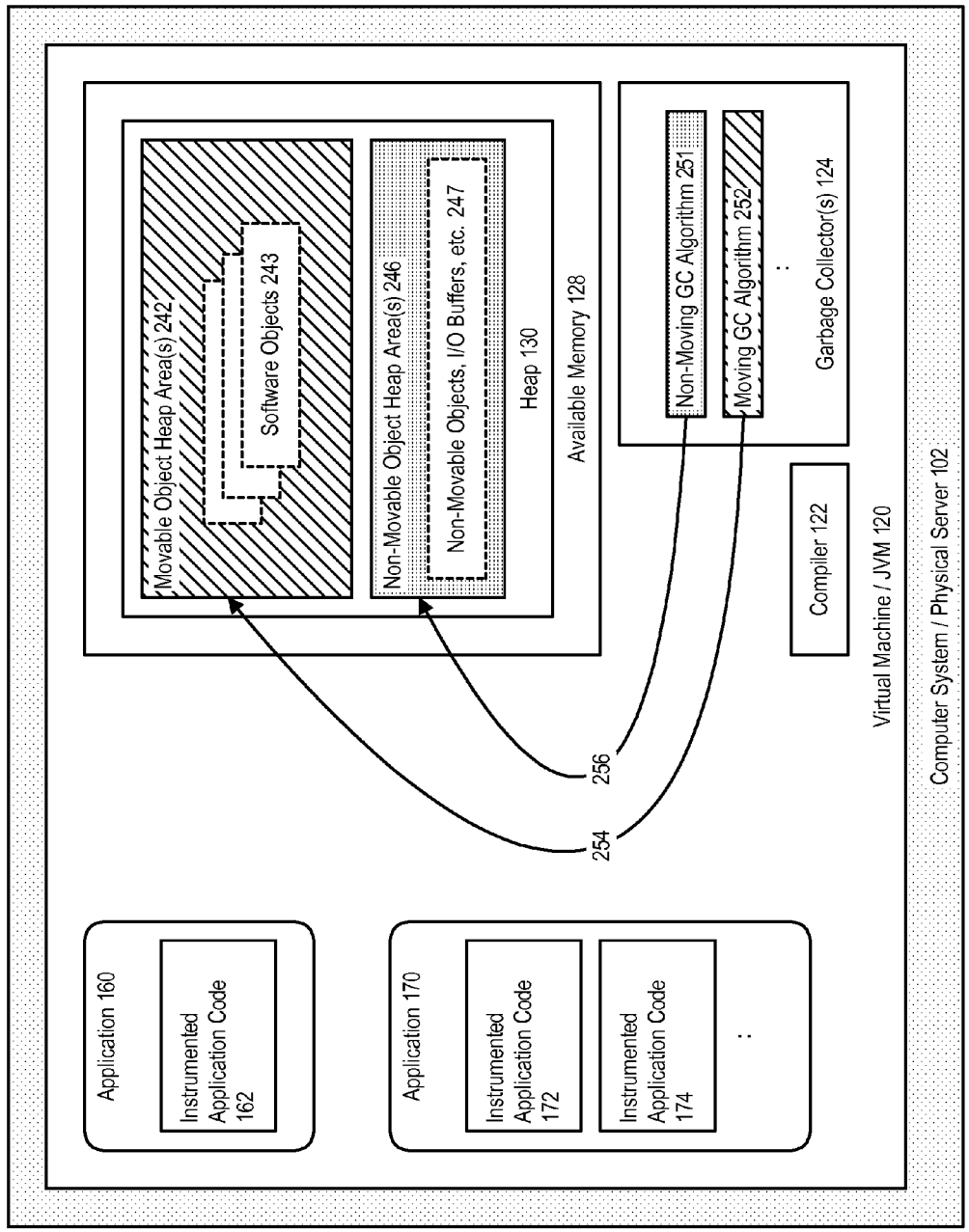
FIG. 11 illustrates a use case for dynamically selecting a garbage collection algorithm based on the contents of heap regions, in accordance with an embodiment.

FIG. 11 illustrates a use case for dynamically selecting a garbage collection algorithm based on the contents of heap regions, in accordance with an embodiment. As shown in FIG. 11, the system can include a region of the heap, here indicated as a movable object heap area(s) 242, that includes movable objects 243; and another region of the heap, here indicated as a non-movable object heap area(s) 246, that includes non-movable objects 247, for example data objects corresponding to I/O buffers.

In accordance with an embodiment, the system can include a plurality of garbage collectors or garbage collection algorithms which include at least one that is a non-moving garbage collection algorithm 251, and another that is a moving garbage collection algorithm 252. During garbage collection, the system can select, based on the particular region to be garbage collected, the particular garbage collection algorithm to be used, and garbage collect 254, 256 the regions appropriately.

Figure 12:
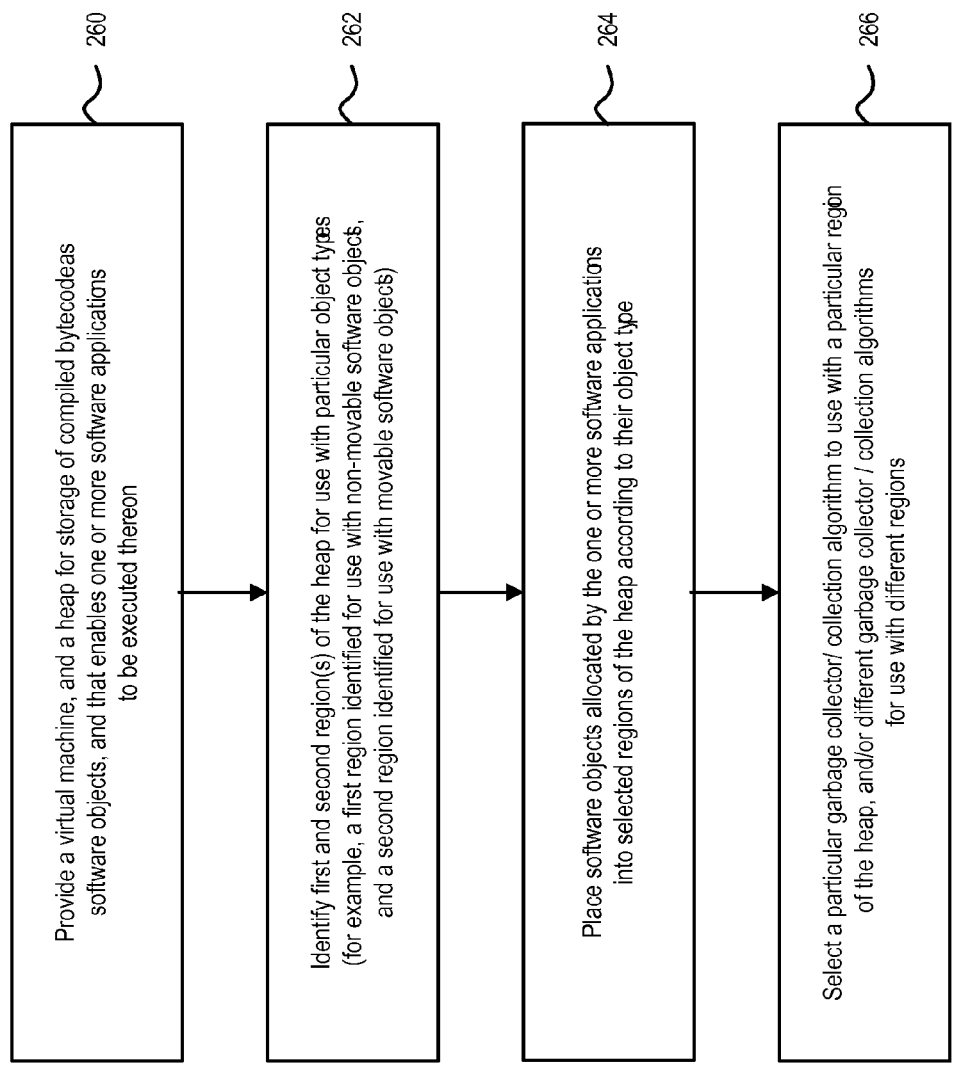
FIG. 12 shows a flowchart of another method for dynamically selecting a garbage collection algorithm based on the contents of heap regions, in accordance with an embodiment.

FIG. 12 shows a flowchart of another method for dynamically selecting a garbage collection algorithm based on the contents of heap regions, in accordance with an embodiment. As shown in FIG. 12, at step 260, a virtual machine is again provided, together with a heap for storage of compiled bytecode as software objects, and that enables one or more software applications to be executed thereon.

At step 262, the virtual machine can identify first and second region(s) of the heap for use with particular object types (for example, a first region identified for use with non-movable software objects, and a second region identified for use with movable software objects). In accordance with an embodiment, At step 264, software objects allocated by the one or more software applications are placed into selected regions of the heap according to their object type.

At step 266, the virtual machine can then select a particular garbage collector/garbage collection algorithm to use with a particular region of the heap, and/or different garbage collector/garbage collection algorithms for use with different regions.

The above flowchart is provided for purposes of illustrating a particular embodiment. In accordance with other embodiments, other methods and steps can be used to dynamically select a garbage collection algorithm based on the contents of heap regions.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. For example, although as described above, the Java language and Java virtual machines are described as examples of a garbage-collected language, in accordance with other embodiments, the systems and methods described herein can be similarly used with other garbage-collected languages and other types of virtual machines.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for garbage collection based on software objects stored in heap regions, the system comprising:
    a computing device which includes a processor, a virtual machine, and a heap for storage of compiled bytecode as software objects, and that enables one or more software applications to be executed thereon;
    wherein the virtual machine comprises a plurality of garbage collectors implementing different garbage collection methods and selected from a serial garbage collector, a parallel garbage collector, a parallel compacting garbage collector, a concurrent mark-sweep garbage collector, a copying garbage collector, and a non-moving garbage collector;
    wherein the heap comprises a plurality of regions for storing software objects;
    wherein each software object allocated by a software application is placed, by the virtual machine, into a region of the plurality of regions of the heap based on an instrumentation of the software application corresponding to the software object, including placement of particular software objects comprising compiled bytecode into different regions of the plurality of regions of the heap;
    wherein the virtual machine determines object statistics for each of the plurality of regions of the heap to determine object types therein; and
    wherein the virtual machine performs garbage collection on each region of the plurality of regions of the heap by
        selecting, based on the objects statistics for said each region of the plurality of regions of the heap, a selected garbage collector of the plurality of garbage collectors to use in said each region of the plurality of regions of the heap; and
        performing garbage collection on said each region of the plurality of regions of the heap using the selected garbage collector;
    wherein different garbage collectors of the plurality of garbage collectors are utilized for said different regions of the plurality of regions of the heap.

2. The system of claim 1, wherein the software applications includes an application code that is instrumented so that the virtual machine determines, based on the instrumented code, to place software objects allocated by the software application, into the different regions of the plurality of regions of the heap.

3. The system of claim 2, wherein the software application includes multiple different parts, and wherein each of the multiple different parts include instrumented code, so that the virtual machine determines, for each particular part of the software application, to place software objects allocated by the particular part of the software application into a particular different region of the plurality of regions of the heap.

4. The system of claim 1, wherein the heap includes a first region of the plurality of regions that generally stores non-movable software objects and a second region of the plurality of regions that generally stores movable software objects, and wherein the virtual machine uses a different garbage collector of said plurality of garbage collectors with each of the first and second regions.

5. A method for garbage collection on a computing device which includes a processor, a virtual machine and a heap for storage of compiled bytecode as software objects, the method comprising:
   defining a plurality of regions in said heap;
   placing each software object allocated by a software application into one of said plurality or regions of the heap based on an instrumentation of the software application corresponding to the software object, including placement of particular software objects into different regions of the plurality of regions of the heap;
   providing in said virtual machine wherein a plurality of garbage collectors implementing different garbage collection methods and selected from a serial garbage collector, a parallel garbage collector, a parallel compacting garbage collector, a concurrent mark-sweep garbage collector, a copying garbage collector, and a non-moving garbage collector;
   determining, with said virtual machine, obiect statistics for each of the plurality of regions of the heap to determine object types therein; and
   performing garbage collection on each region of the plurality of regions of the heap by
      selecting, based on the object statistics for said each region of the plurality of regions of the heap, a selected garbage collector of the plurality of garbage collectors to use in said each region of the plurality of regions of the heap; and
      performing garbage collection on said each region of the plurality of regions of the heap using the selected garbage collector;
      wherein different garbage collectors of the plurality of garbage collectors are utilized for said different regions of the plurality of regions of the heap.

6. The method of claim 5, wherein the software application includes an application code that is instrumented so that the virtual machine determines, based on the instrumented code, to place software objects allocated by the software application, into the different regions of the plurality of regions of the heap.

7. The method of claim 6, wherein the software application includes multiple different parts, and wherein each of the multiple different parts include instrumented code, so that the virtual machine determines, for each particular part of the software application, to place software objects allocated by the particular part of the software application into a particular different region of the plurality of regions of the heap.

8. The method of claim 5, wherein the heap includes a first region of the plurality of regions that generally stores non-movable software objects and a second region of the plurality of regions that generally stores movable software objects, and wherein the virtual machine uses a different garbage collector of the plurality of garbage collectors with each of the first and second regions.

9. A non-transitory computer readable storage medium, including instructions stored thereon for supporting garbage collection on a computing device which includes a processor, a virtual machine and a heap for storage of compiled bytecode as software objects, which instructions, when read and executed, cause the computing device to perform steps comprising:
   defining a plurality of regions in said heap;
   placing each software object allocated by a software application into one of said plurality or regions of the heap based on an instrumentation of the software application corresponding to the software object, including placement of particular software objects into different regions of the plurality of regions of the heap;
   providing in said virtual machine wherein a plurality of garbage collectors implementing different garbage collection methods and selected from a serial garbage collector, a parallel garbage collector, a parallel compacting garbage collector, a concurrent mark-sweep garbage collector, a copying garbage collector, and a non-moving garbage collector;
   determining, with said virtual machine, object statistics for each of the plurality of regions of the heap to determine object types therein; and
   performing garbage collection on each region of the plurality of regions of the heap by
      selecting, based on the object statistics for said each region of the plurality of regions of the heap, a selected garbage collector of the plurality of garbage collectors to use in said each region of the plurality of regions of the heap; and
      performing garbage collection on said each region of the plurality of regions of the heap using the selected garbage collector;
      wherein different garbage collectors of the plurality of garbage collectors are utilized for said different regions of the plurality of regions of the heap.

10. The non-transitory computer readable storage medium of claim 9, wherein at least one of the software applications includes an application code that is instrumented so that the virtual machine determines, based on the instrumented code, to place software objects allocated by the software application, into the different regions of the plurality of regions of the heap.

11. The non-transitory computer readable storage medium of claim 10, wherein the software application includes multiple different parts, and wherein each of the multiple different parts include instrumented code, so that the virtual machine determines, for each particular part of the software application, to place software objects allocated by the particular part of the software application into a particular different region of the plurality of regions of the heap.

12. The non-transitory computer readable storage medium of claim 9, wherein the heap includes a first region of the plurality of regions that generally stores non-movable software objects and a second region of the plurality of regions that generally stores movable software objects, and wherein the virtual machine uses a different garbage collectors of said plurality of garbage collectors with each of the first and second regions.

13. The system of claim 1, wherein, when a garbage collection is invoked at a particular time, the system determines which garbage collector to use with each of the different regions of the plurality of regions of the heap.

14. The method of claim 5, wherein, when a garbage collection is invoked at a particular time, the method determines which garbage collector to use with each of the different regions of the plurality of regions of the heap.

15. The non-transitory computer readable storage medium of claim 9, wherein, when a garbage collection is invoked at a particular time, the computer determines which garbage collector to use with each of the different regions of the plurality of regions of the heap.

16. The system of claim 1, wherein the system is configured to determine, during a particular garbage collection at a particular time, to use a first garbage collector with a first region of the heap, and a second garbage collector with a second region of the heap, based on the object statistics associated with the first region and the second region at said particular time.

17. The method of claim 5, further comprising, determining, during a particular garbage collection at a particular time, to use a first garbage collector with a first region of the heap, and a second garbage collector with a second region of the heap, based on the object statistics associated with the first region and the second region at said particular time.

18. The non-transitory computer readable storage medium of claim 9, further comprising, determining, during a particular garbage collection at a particular time, to use a first garbage collector with a first region of the heap, and a second garbage collector with a second region of the heap, based on the object statistics associated with the first region and the second region at said particular time.

19. The system of claim 1, wherein, when a garbage collection is invoked at a particular time, the virtual machine determines which garbage collector to use with each of the different regions of the heap; and wherein, when a garbage collection is invoked at a subsequent time, the virtual machine determines whether a region's contents have changed, and further determines whether to use a different garbage collector for that region.

20. The method of claim 5, wherein, when a garbage collection is invoked at a particular time, the virtual machine determines which garbage collector to use with each of the different regions of the heap; and wherein, when a garbage collection is invoked at a subsequent time, the virtual machine determines whether a region's contents have changed, and further determines whether to use a different garbage collector for that region.

21. The non-transitory computer readable storage medium of claim 9, wherein, when a garbage collection is invoked at a particular time, the virtual machine determines which garbage collector to use with each of the different regions of the heap; and wherein, when a garbage collection is invoked at a subsequent time, the virtual machine determines whether a region's contents have changed, and further determines whether to use a different garbage collector for that region.

\* \* \* \* \*